(12) United States Patent
Dondi

(10) Patent No.: US 11,072,000 B2
(45) Date of Patent: Jul. 27, 2021

(54) MACHINE, IN PARTICULAR PADDING MACHINE, TO BACKFILL PIPELINES

(71) Applicant: SCAIP S.P.A., Parma (IT)

(72) Inventor: Gian Paolo Dondi, Parma (IT)

(73) Assignee: SCAIP S.P.A., Parma (IT)

(*) Notice: Subject to any disclaimer, the term of this patent is extended or adjusted under 35 U.S.C. 154(b) by 0 days.

(21) Appl. No.: 16/440,475

(22) Filed: Jun. 13, 2019

(65) Prior Publication Data

US 2020/0368780 A1    Nov. 26, 2020

(30) Foreign Application Priority Data

May 24, 2019    (IT) ........................ 102019000007197

(51) Int. Cl.
| | |
|---|---|
| B62D 33/06 | (2006.01) |
| E02F 5/00 | (2006.01) |
| B07B 1/00 | (2006.01) |
| E02F 5/22 | (2006.01) |
| E02F 7/02 | (2006.01) |
| E02F 7/06 | (2006.01) |
| B07B 13/16 | (2006.01) |

(52) U.S. Cl.
CPC .............. B07B 1/005 (2013.01); E02F 5/226 (2013.01); E02F 7/02 (2013.01); E02F 7/06 (2013.01); B07B 13/16 (2013.01)

(58) Field of Classification Search
CPC .. B62D 33/0636; B62D 33/06; B62D 33/063; B62D 33/0633; E02F 9/166; B66C 13/54
See application file for complete search history.

(56) References Cited

U.S. PATENT DOCUMENTS

| | | | | |
|---|---|---|---|---|
| 4,018,473 A | * | 4/1977 | Chalupsky | ........... B62D 33/063 |
| | | | | 296/190.04 |
| 4,049,070 A | * | 9/1977 | Soyland | .................... E02F 9/02 |
| | | | | 180/8.5 |

(Continued)

FOREIGN PATENT DOCUMENTS

| | | |
|---|---|---|
| DE | 3809670 A1 | 10/1989 |
| GB | 2515752 A | 1/2015 |

OTHER PUBLICATIONS

Italian Search Report dated Feb. 12, 2020 from counterpart Italian App No. 201900007197.

*Primary Examiner* — Benjamin F Fiorello
(74) *Attorney, Agent, or Firm* — Shuttleworth & Ingersoll, PLC; Timothy Klima

(57) ABSTRACT

Machine, especially a padding machine, for the burying of pipes, in particular arranged in a respective excavation of the ground, quali gas pipelines, oil pipelines, aqueducts, or altri, in particular for la covering of said pipe with a corresponding material, in particular un treated material, preferably screened or frantumato, including a main support framework of the apparatus, in particular which extends according to a respective longitudinal axis of the same machine, a cabin for housing the driver of the machine, such a cabin is in the form of a cabin movable with respect to said main support frame. Said cabin for housing the driver of the machine can be positioned, in corresponding vertical positions, or placed at height levels different from each other, preferably moving vertically, or perpendicularly to said ground.

15 Claims, 9 Drawing Sheets

(56) References Cited

U.S. PATENT DOCUMENTS

| | | | | |
|---|---|---|---|---|
| 5,618,156 | A * | 4/1997 | Brown | B60K 17/34 180/237 |
| 6,401,368 | B1 * | 6/2002 | McLeod | E02F 3/4135 37/142.5 |
| 6,755,270 | B2 * | 6/2004 | Saarinen | B60N 2/14 180/327 |
| 7,886,463 | B2 | 2/2011 | Greenberg et al. | |
| 9,238,902 | B2 * | 1/2016 | Meinders | E02F 5/08 |
| 9,617,711 | B2 * | 4/2017 | Murtha | E02F 3/964 |
| 10,173,867 | B2 * | 1/2019 | Resch | B62D 33/063 |
| 10,246,147 | B2 * | 4/2019 | Dondi | B60K 17/046 |
| 2002/0154984 | A1 * | 10/2002 | Schaeff | E02F 9/02 414/729 |
| 2006/0103156 | A1 * | 5/2006 | Mieger | E02F 9/166 296/26.04 |
| 2006/0182594 | A1 * | 8/2006 | Wager | B62D 33/063 414/691 |
| 2006/0202514 | A1 * | 9/2006 | Antonetti | B62D 33/0633 296/190.05 |
| 2008/0258535 | A1 * | 10/2008 | Berning | B62D 33/0636 299/39.4 |
| 2009/0250971 | A1 * | 10/2009 | Breitenfeldt | B66C 13/54 296/190.04 |
| 2009/0297275 | A1 | 12/2009 | Davis | |
| 2010/0300786 | A1 * | 12/2010 | Bacon | B62D 33/063 180/89.15 |
| 2011/0004379 | A1 * | 1/2011 | Murota | E02F 3/43 701/50 |
| 2012/0210815 | A1 * | 8/2012 | Breu | B62D 33/063 74/490.01 |
| 2012/0318594 | A1 * | 12/2012 | Riha | B62D 33/0636 180/89.12 |
| 2013/0180442 | A1 * | 7/2013 | Pedersen | B60L 50/50 114/72 |
| 2015/0267378 | A1 * | 9/2015 | Murtha | E02F 3/964 37/410 |
| 2016/0083022 | A1 * | 3/2016 | Hellholm | B66C 13/54 296/190.04 |
| 2017/0233015 | A1 * | 8/2017 | Knutson | E02F 9/2004 296/190.05 |
| 2018/0029851 | A1 * | 2/2018 | Polumati | B66C 23/36 |
| 2019/0047481 | A1 * | 2/2019 | Eppright | B62D 33/0636 |

\* cited by examiner

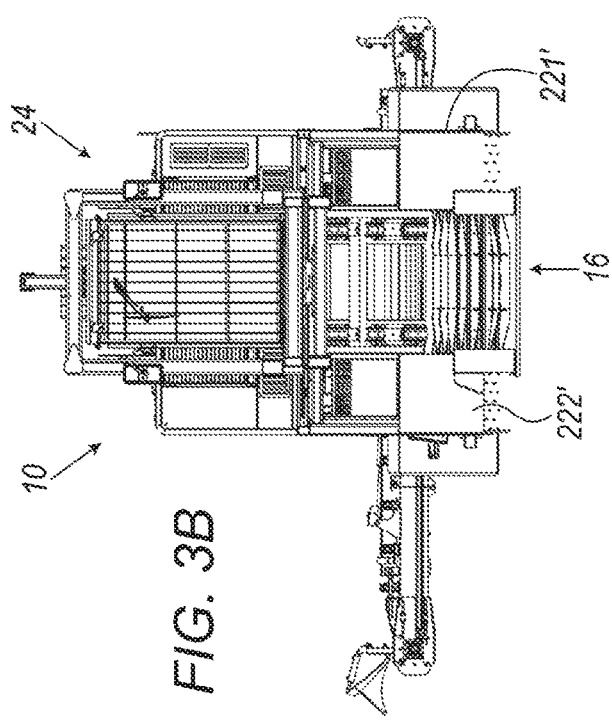
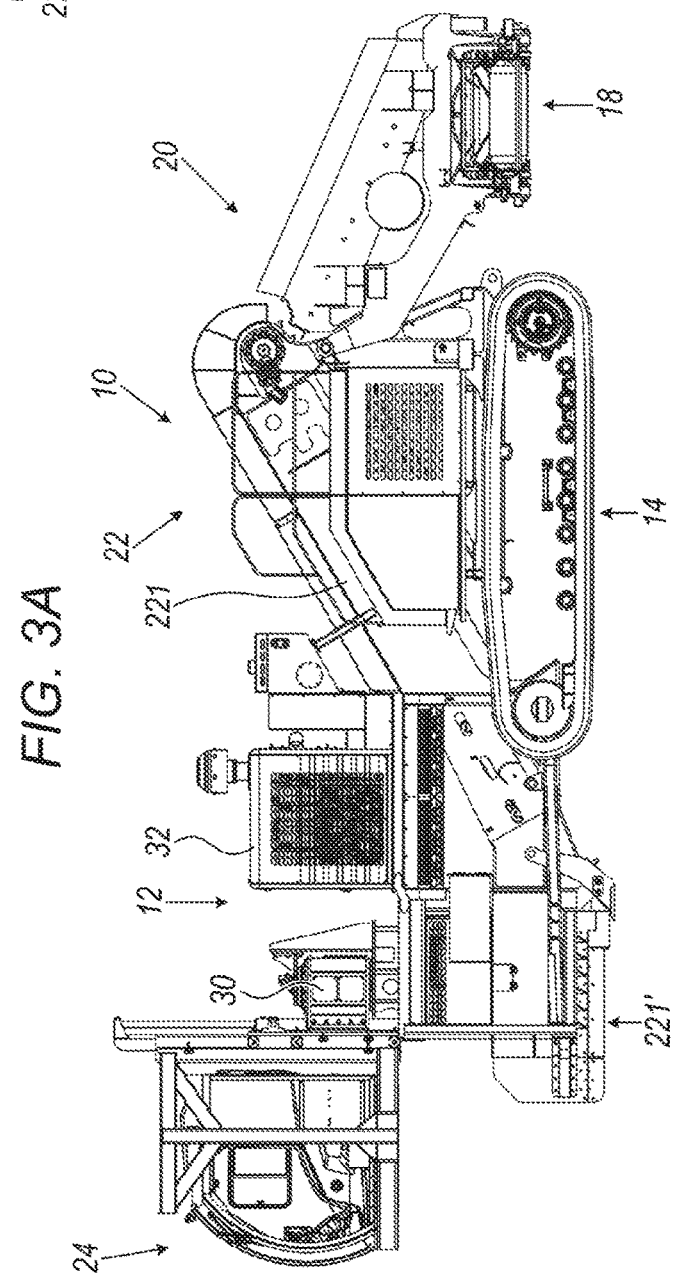
FIG. 3B
FIG. 3A

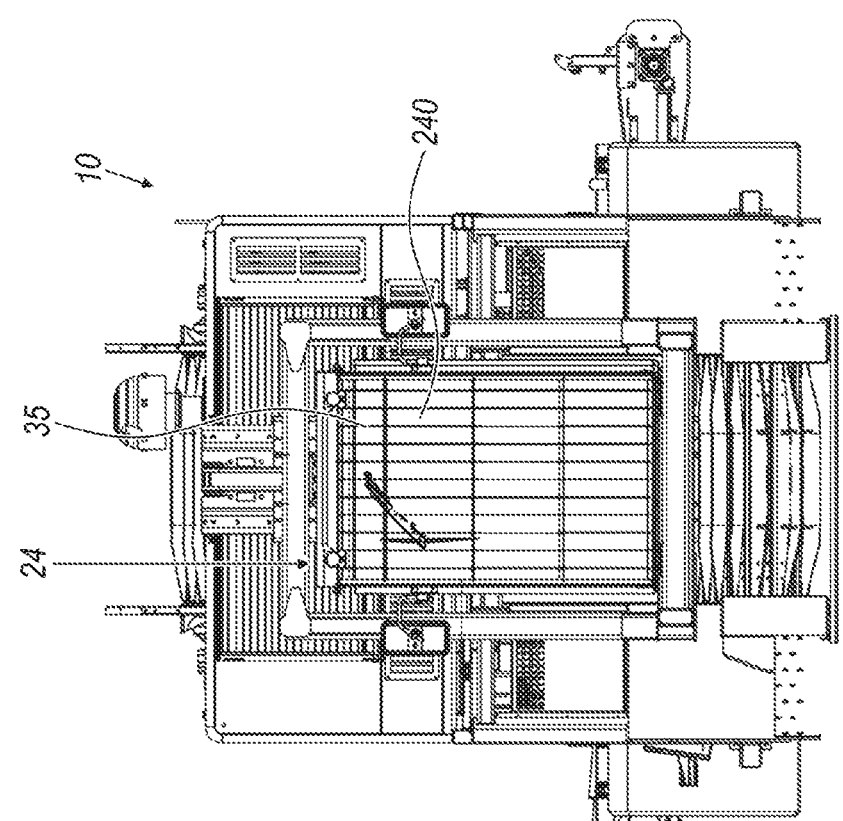
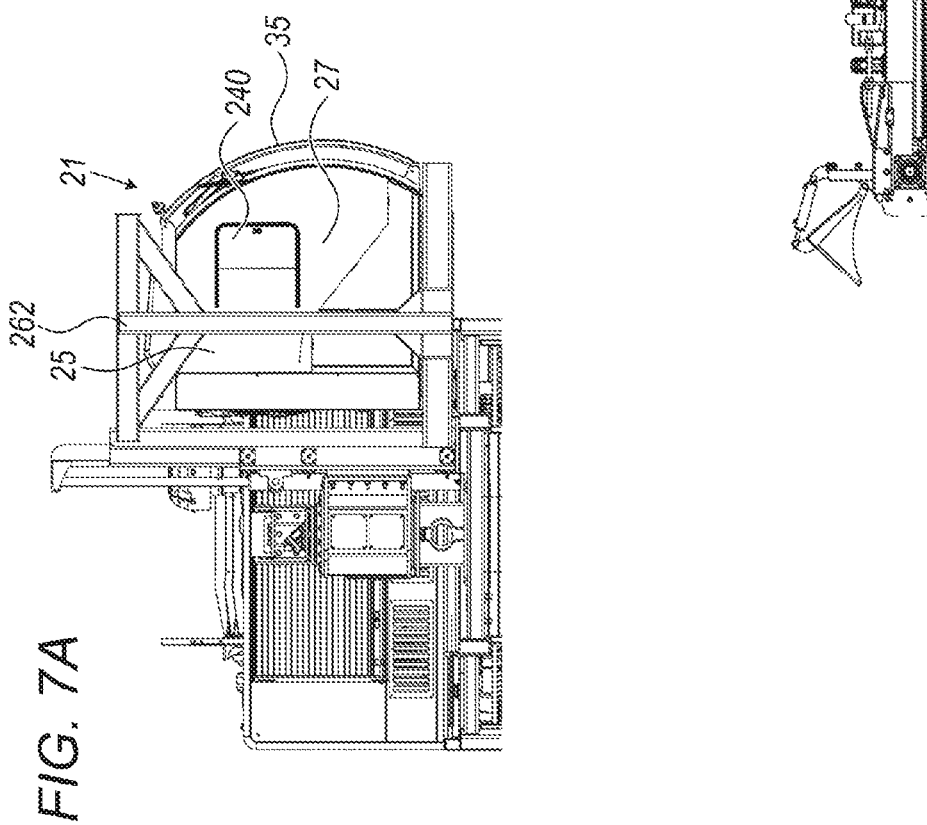
FIG. 7A
FIG. 7B

MACHINE, IN PARTICULAR PADDING MACHINE, TO BACKFILL PIPELINES

CROSS-REFERENCE TO A RELATED APPLICATION

This application claims priority to Italian Application No. 102019000007197 filed May 24, 2019, which application is incorporated by reference herein.

The present finding relates to a machine, especially a padding machine, for the burying of pipes, in particular arranged in a respective excavation of the ground, such as gas pipelines, oil pipelines, aqueducts, or others, and in particular adapted to cover said pipe with a corresponding material.

Preferably said material is a treated, i.e., screened material, or suitably crushed, such as not to damage the pipe or such as not to create empty zones about the same pipe, and preferably consists of the waste material of the pipe laying excavation.

Machines, or padding machines, are known for the burying of pipes, in particular arranged in a respective excavation of the ground, such as gas pipelines, oil pipelines, aqueducts, or other, and in particular adapted to cover said pipe with a corresponding material, which machines comprise a main support frame of the apparatus, a cabin for housing the driver of the machine, such a cabin is in the form of a cabin that is movable transversally between opposite transversal control positions of a respective side of the machine.

In these already known machines, however, the number of devices responsible for the control of the machine needs to be duplicated, and thus there is an excessive number of control devices; furthermore, they are uncomfortable for use by the driver, who has to operate while standing in front of the respective control devices.

Furthermore, in said already known machines, in order to transport the machine, it is necessary to disassemble said cabin, with a considerable loss of time and work for the staff in charge.

Moreover, in said already known machines, for the driver to get on and off said cabin, it is necessary to use bulky elongated stairs, resulting in a risk of falls and consequent injuries for the staff in charge.

Therefore, the need is felt in the art, to provide machines which allow the driver to have a good view, in particular of the operative area of the same machine.

Furthermore, the need is also felt in the art to keep the overall dimensions of the machine to a minimum.

Furthermore, the need is also felt in the art to have a driver who is protected, and who can safely operate.

By the present finding, a solution is proposed, which is new and alternative compared to the solutions known so far, and in particular, the aim is to obviate one or more of the drawbacks or problem cited above and/or to meet one or more of the needs cited above, and/or in any case felt in the art, and which can in particular be inferred from what has been reported above.

Therefore, a machine is provided, especially a self-propelled screen, for the burying of pipes, such as gas pipelines, oil pipelines, aqueducts, or other, in particular adapted to cover said pipe with a corresponding material, preferably consisting of the waste material of the pipe laying excavation; comprising a main support frame of the apparatus, a cabin for housing the driver of the machine, such a cabin is in the form of a cabin movable with respect to said main support frame, characterized in that said cabin for housing the driver of the machine can be positioned, in corresponding vertical positions, or placed at height levels different from each other, preferably moving vertically, or perpendicularly to said ground.

In this manner, it is possible to arrange the cabin in corresponding advantageous vertical operating positions.

This and other innovative aspects are, anyhow, set forth in the attached claims, the technical characteristics of which can be found, together with corresponding advantages achieved, in the following detailed description, illustrating a merely exemplary, non-limiting embodiment of the finding, and which is given with reference to the attached drawings, in which:

FIG. 3A illustrates a schematic side elevational view of the preferred implementation of a machine according to the present finding, with the cabin in transfer guide working condition of the machine;

FIG. 3B illustrates a schematic front elevational view of the preferred implementation of a machine according to the present finding, with the cabin in transfer guide working condition of the machine;

FIG. 7A illustrates a schematic, enlarged front elevational view of the preferred implementation of a machine according to the present finding, with particular illustration of the protection means of the cabin as frontally seen;

FIG. 7B illustrates a schematic, enlarged front elevational view of the preferred implementation of a machine according to the present finding, with particular illustration of the protection means of the cabin, with of the same cabin as laterally seen.

Figure 1A:
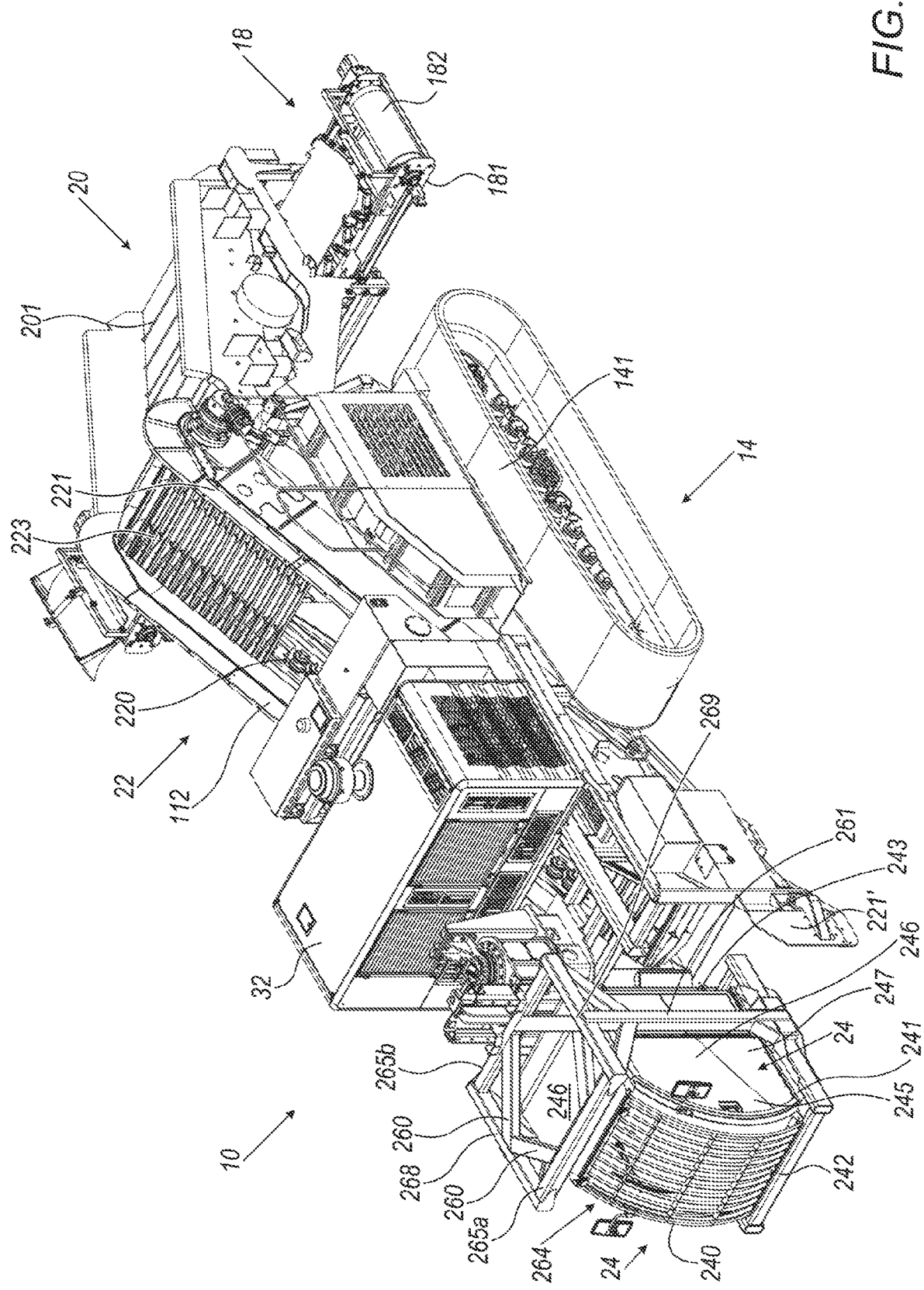
FIG. 1A illustrates a perspective schematic view of a preferred implementation of a machine according to the present finding.
Figure 1B:
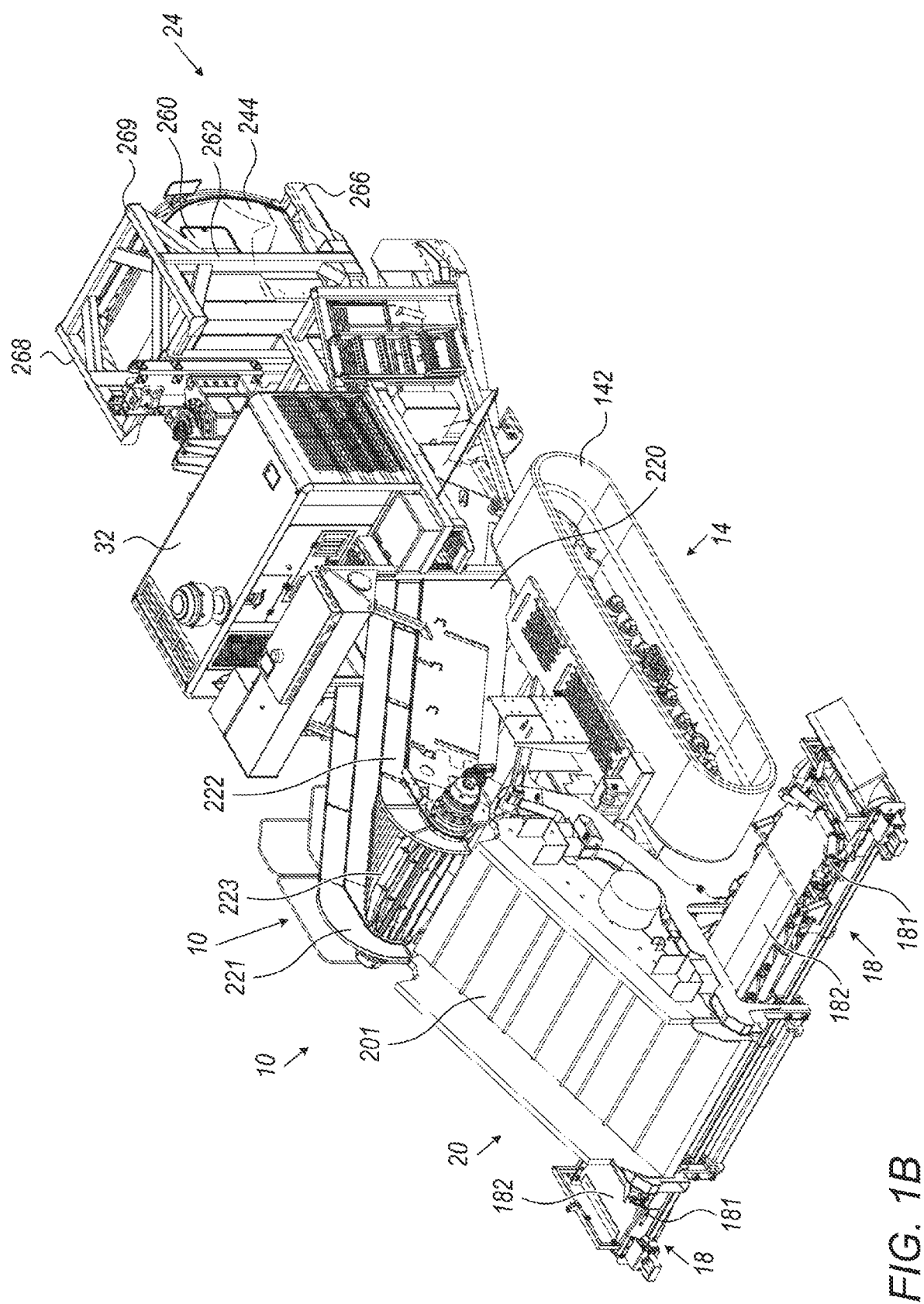
FIG. 1B illustrates a perspective schematic view, taken from a different side with respect to the one of FIG. 1A, of the preferred implementation of a machine according to the present finding.

In the attached figures, a preferred implementation 10 of the machine is illustrated, especially a padding machine, for the burying of pipes, in particular arranged in a respective excavation of the ground, for example, gas pipelines, oil pipelines, aqueducts, or others, and in particular in the form of a machine for the covering of said pipe with a corresponding material, especially such a treated, i.e. screened, material, as to not damage the pipe or such as not to create empty zones around the same pipe, and preferably consisting of the waste material of the pipe laying excavation.

In particular, the machine 10 comprises a main support framework 12 of the apparatus, in particular which extends according to a respective longitudinal axis of the same machine 10, and a cabin 24 for housing the driver of the machine 10, such a cabin, it will be in any case best inferred from the following of the present description, is in the form of a cabin movable with respect to said main support frame 12.

As illustrated, said cabin 24 for housing the driver of the machine 10 has a lower wall 241, defining a lower support platform of the cabin 24, a front wall 242, a rear wall 243, opposite side walls 244, 245, and an upper covering wall 246, and, furthermore, it is provided with corresponding view windows for the driver 240, at least provided at the front wall 242 and at least part of the side walls 244, 245, in particular in a substantial prolongation to, or in the proximity of, the front window, as well as having at least a small door 247 for the access to the same cabin 24, preferably provided at a side wall 244 or 245 of the same cabin 24.

In particular, as it can be inferred from said figures, in the machine means 14 for advancing the machine with respect to the ground are provided, in particular in the form of revolving means, which engage the ground and support said main support frame 12, and preferably a first and a second side tracks 141, 142 for advancing and supporting the machine on the ground.

In particular, as it can be inferred from the figures, in the machine means, or apparatus, 16 for the collection of a material for covering the pipe are provided, in particular for the collection of said material from the ground, in particular comprising a member 161 for separating said material, in particular in the form of a horizontal cutting member.

In particular, as it can be inferred from FIG. 1A, the machine has means, or apparatus, 18 for discharging the material, in particular the treated material, above said pipes, and especially into the housing excavation of the same pipe, in particular said means, or apparatus, 18 for discharging the material are adapted to laterally extend, beyond the respective side of said machine 10, in particular at both sides of the same machine 10, and preferably are in the form of a respective conveyor belt having a support frame 181 supported by said main support frame 12 of said machine 10 and an endless belt 182 rotatable on said support frame.

In particular, as it can be inferred from FIG. 1A, in the machine means, or apparatus, 20 are provided, for the treatment of said material, in particular in the form of means, or apparatus, for screening said material, in particular including a perforated plate 201, preferably extending from the top down, according to the rear direction with respect to the machine 10, on which plate 201 said material is dropped, which material falls, passing through the screen on the upstream end of said means, or apparatus 18 for discharging the material, while that portion of the material that does not pass through the screen is preferably discharged at the rear of the same machine 10.

However, it shall be understood that said perforated plate could also be substituted by a convenient net suitable to the purpose.

Furthermore, the machine could comprise means for treating the material which, being in the form of the above-mentioned screen, could also be defined by corresponding bars or rotors which are adapted to perform the same function, or in the form of a corresponding crusher, adapted to crush the stones or hard material of said material, in order to reduce the dimensions thereof.

In particular, as it can be inferred from the figures, in the machine, means, or apparatus 22 are provided, for lifting the material above said means, or apparatus 18 for the treatment of said material, which are preferably in the form of a respective ascending conveyor belt, extending between a lowered end upstream, substantially at the level of the ground, receiving the material through said means, or apparatus 16 for the collection of a material for covering the tube, and a lifted end downstream, which lets the material fall on said means, or apparatus 20 for the treatment of said material.

Said means, or apparatus 22 for lifting the material above said means, or apparatus 18 for the treatment of said material comprising a frame 220 for supporting an endless lifting belt 223, which frame 220 is supported by said main support frame 12 of said machine 10, with said endless belt 223 being rotatable on said support frame 220.

As illustrated, said means, or apparatus 22 for lifting the material above said means, or apparatus 18 for the treatment of said material have opposite side small edges 221, 222 for holding the material on said endless belt, which small edges extend, diverging from each other, anteriorly to said endless belt with respective ends 221', 222', which are arranged at the same ground and provide for centrally conveying it on said endless lifting belt 223, and/or on said means, or apparatus 16 for the collection of a tube covering material.

Advantageously, as it can be inferred from the figures, said cabin 24 for housing the driver of the machine 10 can be positioned, in corresponding vertical positions, or placed at height levels different from each other, preferably moving vertically, or perpendicularly to said ground, or perpendicularly to a corresponding horizontal plane 120 of the framework 12 of the machine supporting said cabin 24, in particular defined by corresponding transversal bars.

In this manner, it is possible to arrange the cabin in corresponding advantageous vertical operating positions.

Advantageously, as it can be inferred in particular from FIG. 7A, said cabin 24 for housing the driver of the machine 10 has a single seat 25 for the driver and the corresponding devices 27 for controlling the machine, arranged at said seat 25 and in particular internally, or at the rear, with respect to the front wall 242 of the same cabin 24 for housing the driver of the machine 10.

As it is inferred from the corresponding figures, said seat is adapted to support a driver facing the front wall of the cabin.

In this manner, the number of devices to control the machine needs not to be duplicated; and, furthermore, the driver can operate while always staying in a sitting condition.

With advantage, as it can be inferred from the figures, said cabin 24 for housing the driver of the machine 10 is supported, in particular directly supported, by said support framework 12, and with respect to which it is movable in corresponding operating positions, as it will be in any case best inferred from the following of the present description.

In particular, advantageously, said cabin 24 for housing the driver of the machine 10 is movable in a lowered transport position, in which it falls within the corresponding vertical footprint of the machine, in particular having the respective upper part, in particular the respective part which is at the upper wall 246 of the cabin 28, which is in height inferiorly positioned with respect to the upper end part 22' of the remaining part of said machine 10, or of the upper end part 22' of said means, or apparatus 22 for lifting the material above said means, or apparatus 18 for the treatment of said material.

As it can be inferred from the figures, in the normal advancing position of the machine, i.e., also in said transport position, said cabin 24 for housing the driver of the machine 10 has the respective wall or front face 242, which is directed longitudinally forward and with the respective side walls 244, 245, which are transversally recessed with respect to the sides of said machine 10.

In this manner, it is possible to transport the machine without having to disassemble said cabin.

In particular, as it can be inferred from the figures, in the normal advancing position of the machine, i.e., also in said transport position, the cabin 28 is centrally positioned with respect to the footprint or transversal extension of said machine 10.

Figure 2A:
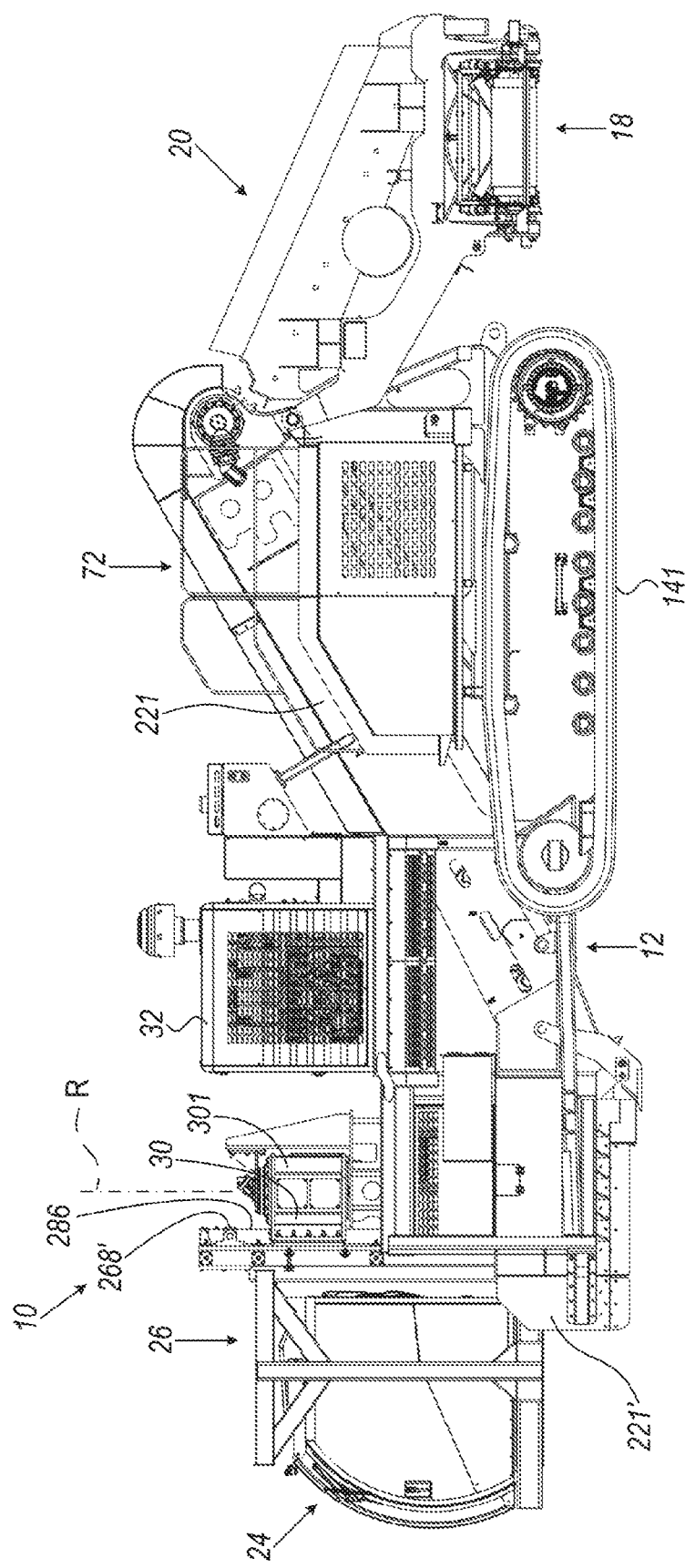
FIG. 2A illustrates a schematic side elevational view of the preferred implementation of a machine according to the present finding, with the cabin in a lowered condition for the access by the driver or operator.
Figure 2B:
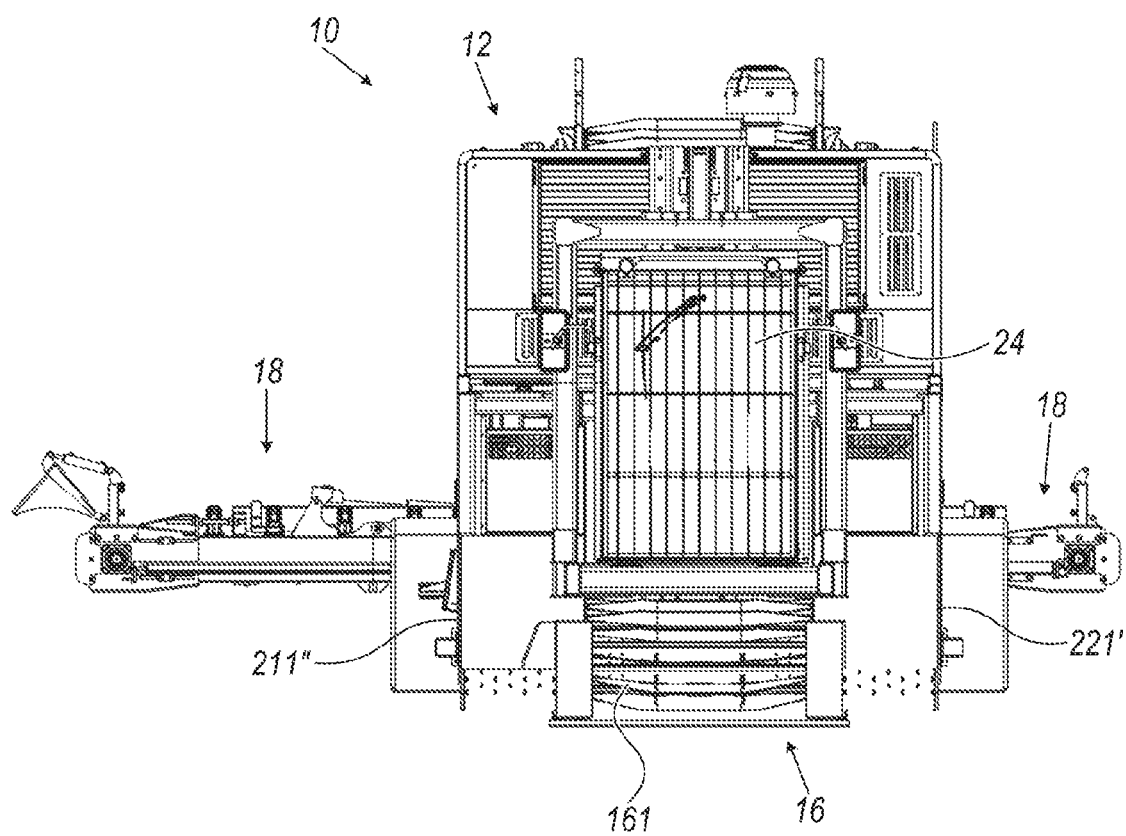
FIG. 2B illustrates a schematic front elevational view of the preferred implementation of a machine according to the present finding, with the cabin in lowered condition for the access by the driver or operator.

In a particularly advantageous manner, as it can be inferred from the FIGS. 2A and 2B, said cabin 24 for housing the driver of the machine 10 is in the form of a cabin 24 movable in a lowered position, which for the same driver is to access to and/or exit from the same housing cabin 24, in particular, said lowered access and/or exit position of the driver from the same cabin 28 is such as to allow the access and/or exit of a driver who positions himself on the ground on which the same machine 10 rests.

In this manner, it is possible for the driver to get on and off said cabin without the aid of bulky elongated stairs.

With advantage, in said lowered position for the access and/or exit of the driver, the respective support lower wall 241 of the same cabin 24 is at a height from the ground ranging between 65 cm and 80 cm, and preferably at a height equal to, or substantially equal to, 70 cm.

Advantageously, as it can be inferred from the FIGS. 3A to 5, said cabin 24 for housing the driver of the machine 10 is in the form of a cabin 24 movable in a respective raised working position.

Advantageously, as it can be inferred from the FIGS. 3A to 5, said cabin 24 for housing the driver of the machine 10 in the respective raised working position protrudes vertically above and beyond, or has the respective upper part, or wall 246 which is vertically above the upper end part 22' of the remaining part of said machine 10, or of the upper end part 22' of said means, or apparatus 22 for lifting the material above said means, or apparatus 18 for the treatment of said material.

In this manner, it is possible for the driver to have a good view.

With advantage, as it can be inferred from the FIGS. 3A and 3B, said cabin 24 for housing the driver of the machine 10 is in the form of a cabin 24 movable in a respective working position, in particular raised, for driving the machine in transfer advance, preferably in which said cabin 24 for housing the driver of the machine 10 has the respective wall or front face 242 which is directed longitudinally forward.

Advantageously, as it can be inferred from the figures, said position of the cabin 24 for driving the machine in transfer advance is vertically aligned with said lowered position of the same cabin 24 for the access and/or exit of the driver.

In this manner, the predetermined longitudinal size of the machine is maintained.

In a particularly advantageous manner, said position of the cabin 24 for driving the machine in transfer advance, and/or said lowered position of the same cabin 24 for the access and/or exit of the driver, are vertically aligned, or is vertically aligned, to said lowered position of the same cabin 24 for transposing the same machine 10.

In this manner, the predetermined longitudinal size of the machine is maintained.

With advantage, as it can be inferred from the figures, said cabin 24 moves between said position for driving the machine in transfer advance and said lowered position of the same cabin 24 for the access and/or exit of the driver, or between said position for driving the machine in transfer advance, or said lowered position of the same cabin 24 for the access and/or exit of the driver, and said lowered position of the same cabin 24 for transposing the same machine 10, with vertical movement, or with movement perpendicular to said ground, or perpendicular to the main support framework 12 of the machine.

In this manner, the predetermined longitudinal size of the machine is maintained.

Figure 4B:
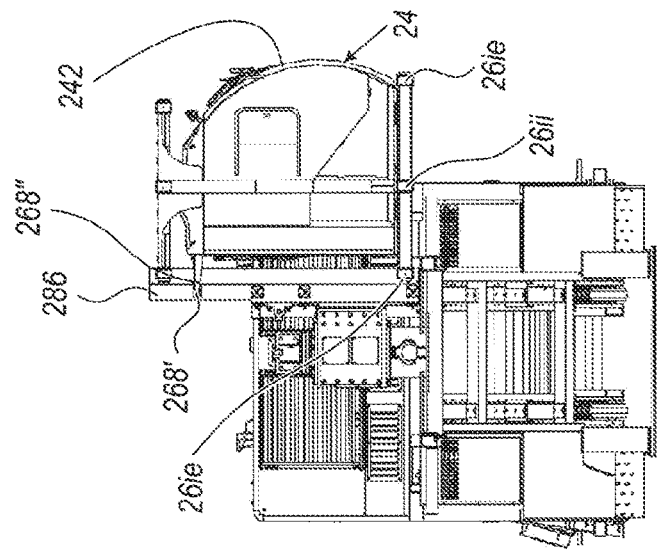
FIG. 4B illustrates a schematic front elevational view of the front part of the preferred implementation of a machine according to the present finding, with the cabin in rotated working condition for controlling the burying of the excavation.
Figure 4A:
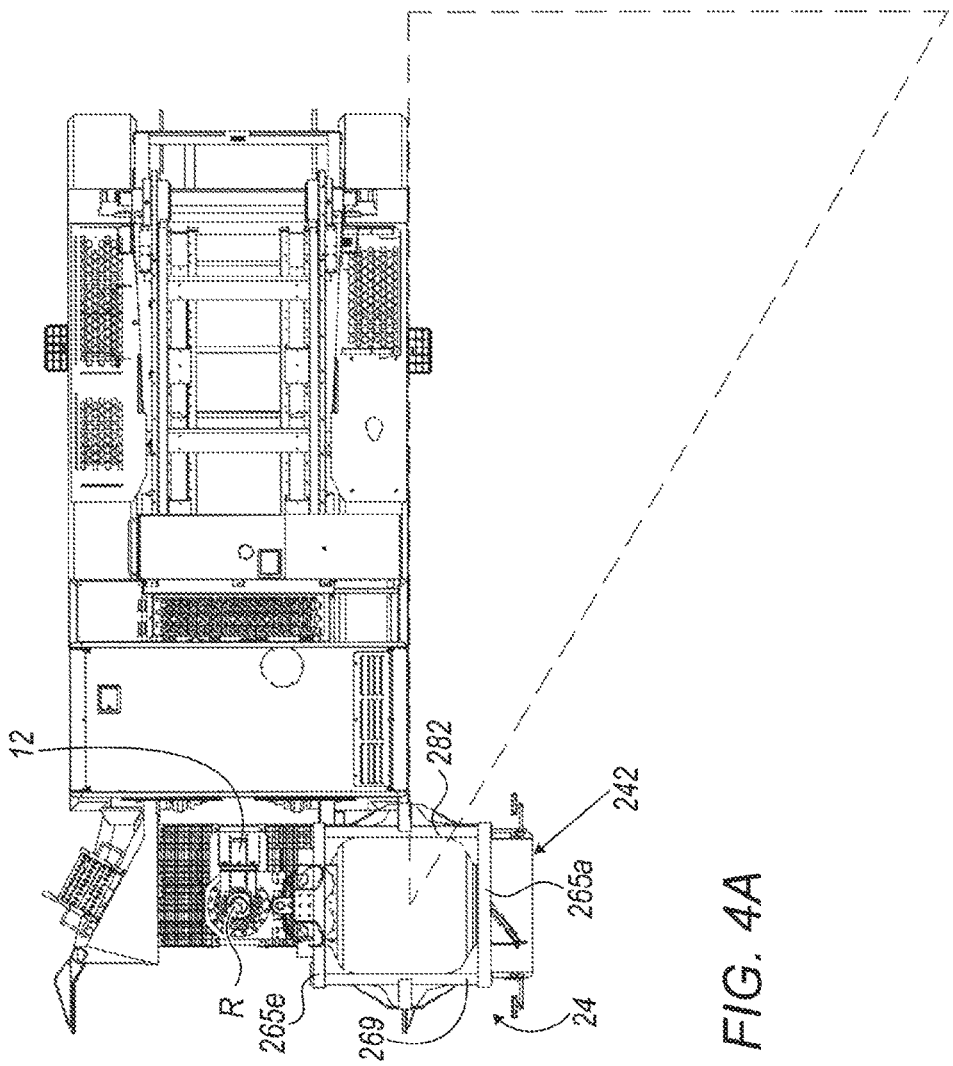
FIG. 4A illustrates a schematic side elevational view of the front part of the preferred implementation of a machine according to the present finding, with the cabin in rotated working condition for controlling the burying of the excavation.
Figure 5:
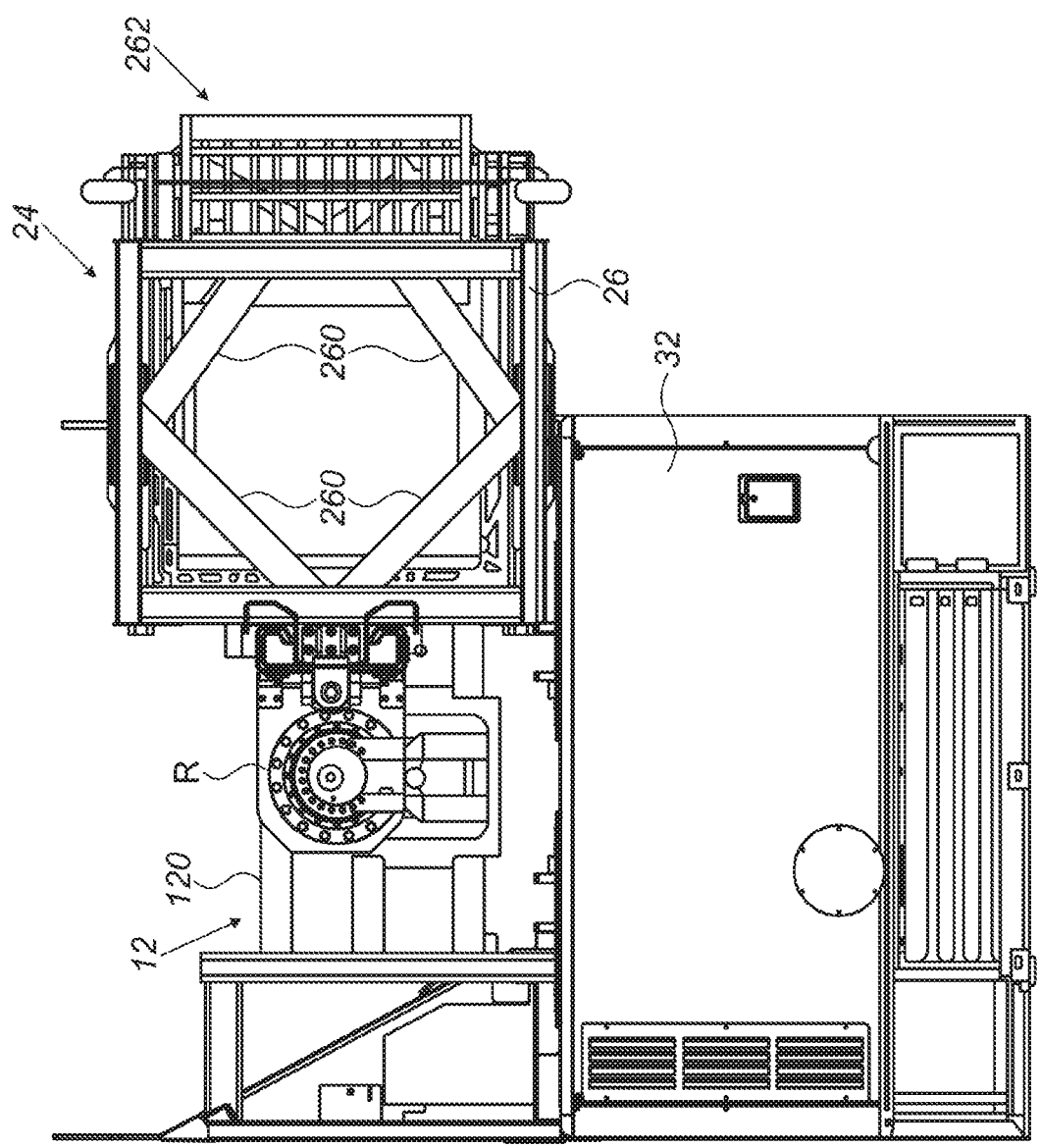
FIG. 5 illustrates a schematic top plan view of a detail of the preferred implementation of a machine according to the present finding, which illustrates the cabin rotated on the opposite side from the one illustrated in the FIGS. 4A and 4B.

Advantageously, as it can be inferred from the FIGS. 4A to 5, said cabin 24 for housing the driver of the machine 10 moves in a respective lateral working position, in which it controls a respective side of the machine 10, or in respective first and second opposite lateral working positions, in which it controls the respective side of the machine 10, in which lateral working positions it controls the covering of the pipe, i.e., the filling of the excavation, with said material, as pointed out by the dashed line of FIG. 4A, while controlling the forwarding of the machine.

Advantageously, as it is inferred from the corresponding figures, in the respective lateral working position, the same cabin 24 has the corresponding wall or front face 242 which is laterally facing the machine 10.

In this manner, it is possible to use only one seat for the driver, and single control devices to drive the respective working operation of the machine.

With advantage, as it can be inferred from the figures, said cabin 24 for housing the driver of the machine 10 in the respective working position projects in cantilevered fashion from said machine 10, in particular supported by said main support frame of the machine 10.

Advantageously, as it can be inferred from the figures, said cabin 24 for housing the driver of the machine 10, in the respective position for driving the machine in transfer advance, projects in cantilevered fashion longitudinally of said machine 10.

Advantageously, as it can be inferred from the figures, said cabin 24 for housing the driver of the machine 10 in the respective lateral working position, in which it controls a respective side of the machine 10 projects cantilevered sideways to said machine 10, in particular extending beyond the side of the machine.

With advantage, as it can be inferred from the figures, said cabin 24 for housing the driver of the machine 10 is movable, through a rotation movement with respect to a respective axis R, in particular perpendicular or vertical, in a lateral working position, in which it controls a respective side of the machine 10, or in respective first and second opposite lateral working positions, in which it controls the respective side of the machine 10.

In a particularly advantageous manner, as it can be inferred from the figures, said rotation axis R is outside the cabin and is preferably rearward and spaced therefrom.

Advantageously, as it can be inferred from the figures, said cabin 24 for housing the driver of the machine 10 is movable, through said rotation movement, between said first and second opposite lateral working positions, in which it controls the respective side of the machine 10, with an angular movement equal to, or substantially equal to, 180°.

With advantage, as it can be inferred from the figures, said cabin 24 for housing the driver of the machine 10 is movable, through said rotation movement, between the respective lateral working position, in which it controls the respective side of the machine 10, and said driving position of the machine in transfer advance, with angular movement equal to, or substantially equal to, 90°.

Advantageously, said cabin 24 moves perpendicularly downwards only when the same cabin 24 for housing the driver of the machine 10 is the position for driving the machine in transfer advance working facing longitudinally with respect to the machine 10.

Advantageously, as it can be inferred from the figures, in the lowered position for the access and/or exit of the driver, the cabin 24 has the lower part thereof, in particular at least said lower wall 241, defining a lower support platform of the cabin 24, which is arranged next to the respective front end 221', 222' of the respective side small edge 221, 222 for conveying the ground of said means, or apparatus, 22 for lifting the material above said means, or apparatus 18 for the treatment of said material, or between said front ends 221', 222' of the same side small edges 221, 222 for conveying the ground of the same means, or apparatus 22 for lifting the material.

With advantage, as it can be inferred from the figures, said cabin 24 for housing the driver of the machine 10 is supported by a corresponding support frame 26.

In a particularly advantageous manner, as it can be inferred from the figures, said frame 26 for supporting said cabin 24 for housing the driver of the machine 10 has a rotatable fulcrum with respect to said main support frame 12, in particular with respect to said rotation axis R of the cabin 24.

Advantageously, as it can be inferred from the figures, said frame 26 for supporting said cabin 24 for housing the driver of the machine 10 is supported vertically movable with respect to said main support frame 12.

With advantage, as it can be inferred from the figures, said frame 26 for supporting said cabin 24 for housing the driver of the machine 10 comprises side upright means, preferably comprising opposite first and second side uprights 261, 262, in particular arranged in an intermediate position with respect to the respective side of said cabin 24 for housing the driver of the machine 10.

In this manner, the cabin support frame does not obstruct the driver's view.

Advantageously, as it can be inferred from the figures, said frame 26 for supporting said cabin 24 for housing the driver of the machine 10 comprises rear upright means, preferably a respective rear upright 263, in particular centrally located.

Advantageously, as it can be inferred from the figures, said frame 26 for supporting said cabin 24 for housing the driver of the machine 10 comprises lower strut means, preferably comprising a plurality of lower struts, including a pair of side lower struts 265, 266, and optionally an intermediate strut.

With advantage, as it can be inferred from the figures, said frame 26 for supporting said cabin 24 for housing the driver of the machine 10 comprises upper strut means, preferably comprising a plurality, in particular a pair of upper struts 268, 269, in particular arranged at the respective side of said cabin 24 for housing the driver of the machine 10.

Advantageously, as it can be inferred from the figures, said opposite first and second side uprights 261, 262 connect together, in an intermediate position, the corresponding lower struts 265, 266 and upper struts 268, 269.

In a particularly advantageous manner, as it can be inferred from the figures, lower crossbeam means are provided, in particular comprising corresponding front and rear crossbeams, 26ia, 26ip, respectively, and an intermediate crossbeam 26ii, which are preferably equidistant therefrom, which, especially at the respective ends, connect said lower struts 265, 266 together.

With advantage, as it can be inferred from the figures, upper crossbeam traverso are provided, in particular comprising corresponding front and rear crossbeams 26sa, 26sp, respectively, which connect, especially at the respective ends, said pair of side upper struts 268, 269.

Advantageously, as it can be inferred from the figures, respective oblique reinforcements 260 are provided, which connect the side upper struts 268, 269, of said frame 26 for supporting said cabin 24 for housing the driver of the machine 10, to the corresponding front and rear crossbeams 26sa, 26sp, respectively.

Advantageously, as it can be inferred from the figures, said rear upright 263 is connected to the rear upper crossbeam 26sp and to the rear lower crossbeam 26ip.

With advantage, as it can be inferred from the figures, in the machine 10, said frame 26 for supporting said cabin 24 for housing the driver of the machine 10 is vertically, or perpendicularly, connected while being movable to a corresponding rotatable frame 28, in particular a horizontally rotatable frame.

Figure 6:
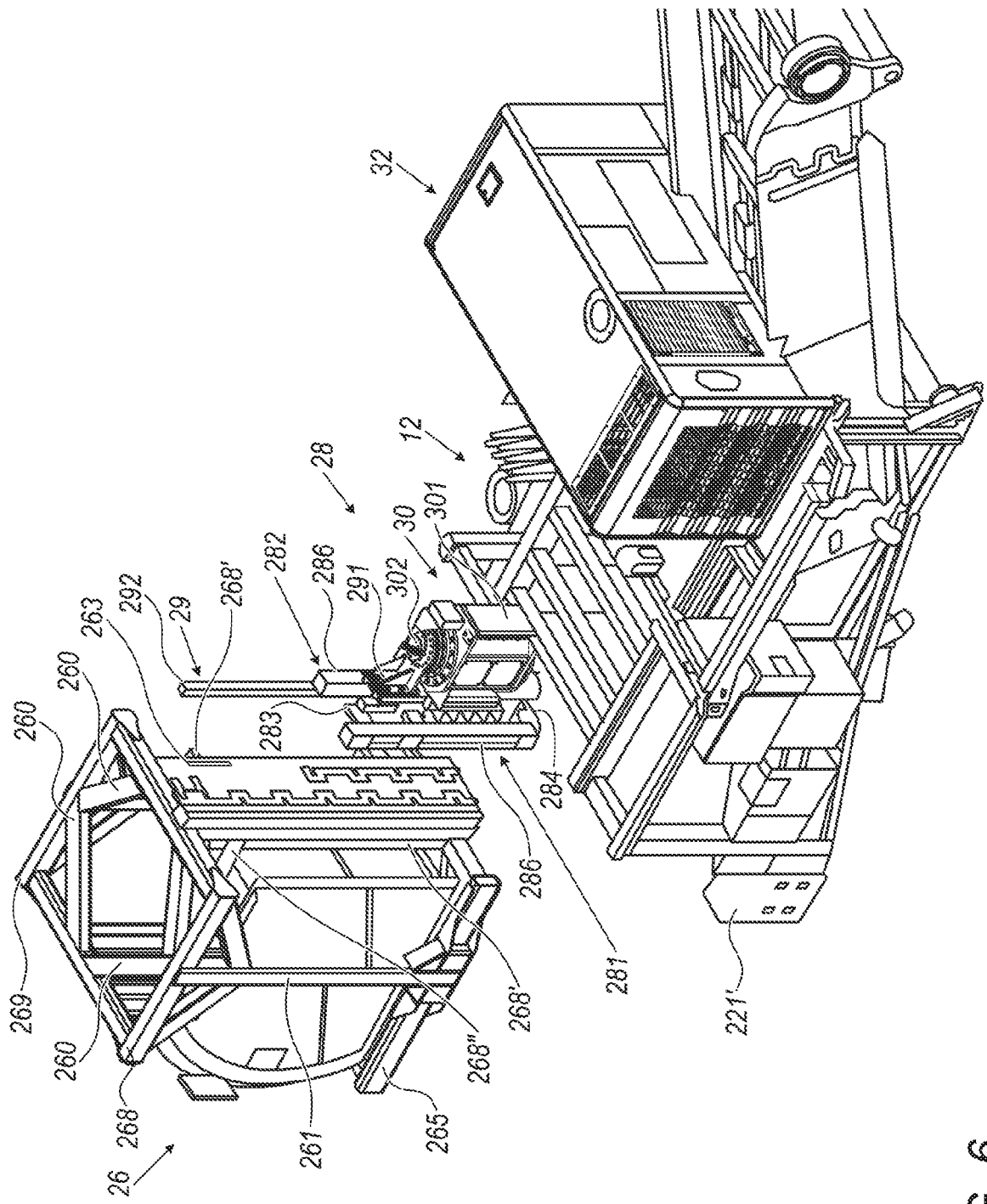
FIG. 6 illustrates an exploded perspective schematic view of the preferred implementation of a machine according to the present finding.

Advantageously, as it can be inferred in particular from FIG. 6, said frame 26 for supporting said cabin 24 for housing the driver of the machine 10 is vertically, or perpendicularly, actuated while being movable with respect to said rotatable frame 28, through corresponding actuating means 29, preferably in the form of a corresponding cylinder, preferably a hydraulic cylinder, 29, in particular vertically, or perpendicularly, oriented, and having the respective cylinder 291 secured to said rotatable frame 28 and the corresponding movable stem 292 connected to said frame 26 for supporting said cabin 24 for housing the driver of the machine 10.

In a particularly advantageous manner, as it can be inferred from the figures, said frame 26 for supporting said cabin 24 for housing the driver of the machine 10 is connected to the corresponding rotatable frame 28, through corresponding guide means 268', 286 on said frame 26 for supporting said cabin 24 for housing the driver of the machine 10 and on said rotatable frame 28, respectively.

In particular, said guide means comprise a pair of parallel guides 286, 286 on said rotatable frame 28 and a pair of sliding pads 268', 268' at the end of corresponding arms 268", 268", projecting at the rear from said frame 26 for supporting said cabin 24 for housing the driver of the machine 10.

With advantage, as it can be inferred from said FIG. 6, said rotatable frame 28 comprises a pair of vertical uprights 281, 282, in particular bearing said vertical guides 286, 286, and a pair of crossbeams, respectively upper and lower crossbeams 283, 284.

Advantageously, as it can be inferred from the figures and in particular from FIG. 6, in the machine a corresponding fulcrum body 30 is provided, in particular having a part, in particular an outer part 301, which is supported in a fixed condition by said main support frame 12, and a part 302, which is rotatably supported by said fixed part 301, preferably internally to the same fixed part 301, which rotatable part 302 is integral, at a respective side, of said rotatable frame 28, which is thus supported off-centered with respect to said rotation axis R.

Advantageously, as it can be inferred from the figures, actuating means for the rotation of said cabin 24 for housing the driver of the machine 10 are provided.

With advantage, as it can be inferred from the figures, said actuating means for the rotation of said cabin 24 for housing the driver of the machine 10 comprise a corresponding motor, in particular housed within said fulcrum body 30, or in the form of corresponding hydraulic cylinder means, which rotate said rotatable part 302 of the fulcrum body 30.

In a particularly advantageous manner, as it can be inferred from the figures, means, or apparatus 32 for the actuation of said machine 10, or for moving said means 14 for advancing the machine with respect to the ground and/or other operative means of the machine 10 are provided.

Advantageously, as it can be inferred from the figures, said fulcrum body 30 is supported in front of said means, or apparatus 32 for the actuation of said machine 10.

With advantage, as it can be inferred from the FIGS. 7A and 7B, means 35 for the protection of the cabin 24, in particular of said front wall 242 of the cabin 24 are provided.

Advantageously, as it can be inferred from the FIGS. 7A and 7B, said means for protecting the cabin 24, in particular of said front wall 242 of the cabin 24, comprise a corresponding protection grid, in particular a metallic grid 35, especially arranged in front of said front wall 242 of the cabin 24.

With advantage, said protection grid, in particular a metallic grid 35, extends throughout the entire extent of said front wall 242 of the cabin 24 and it is preferably curved in order to follow the curved trend thereof.

In this manner, the driver is protected, and he/she can safely operate.

Advantageously, in a preferred manner, said lowered transport position coincides, or substantially coincides, with said lowered position for the access and/or exit of the driver.

Advantageously, said movable stem 292 of the actuating means is in an extended condition for positioning the cabin 24 in said position for driving the machine in transfer advance, and in a retracted condition for positioning the cabin 24 in said lowered position for the access and/or exit of the driver, i.e., in said lowered transport position.

In this manner, it is easy to drive the actuating means and/or when the machine is transposed it is not necessary to keep the hydraulic circuit under pressure.

In practice, as it can be understood, the technical characteristics illustrated above allow, singularly or in a respective combination, achieving one or more of the following advantageous results:

it is possible to arrange the cabin in advantageous vertical operating positions;

the number of devices to control the machine needs not to be duplicated;

it is possible to transport the machine without having to disassemble said cabin;

it is possible for the driver to get on and off said cabin without the aid of bulky elongated stairs;

it is possible for the driver to have a good view;

the predetermined longitudinal size of the machine is maintained;

it is possible to use only one seat for the driver and single control devices to drive the respective working operation of the machine;

the cabin support frame does not obstruct the driver's view;

the driver is protected, and he/she can safely operate.

The present finding is susceptible of obvious industrial application. Furthermore, those skilled in the art will be able to devise a number of modifications and/or variations to make to the same finding, while still falling within the scope of the inventive concept, as widely set forth herein. Furthermore, those skilled in the art will be able to devise further preferred implementations of the finding, which comprise one or more of the above-illustrated characteristics of the preferred implementation. Furthermore, it has also to be understood that all the details of the finding can be substituted by technically equivalent members.

The invention claimed is:

1. A padding machine, for burying a pipe and adapted to cover the pipe with a material, comprising:
   a main support frame,
   a cabin for housing a driver of the padding machine, the cabin being movable with respect to the main support frame, wherein the cabin is movable to be positionable in a plurality of vertical positions different from each other by vertical movement or movement perpendicular to a ground on which the padding machine sits,
   wherein the cabin is movable to a lowered transport position, in which the cabin is positioned within a vertical footprint of the padding machine, with an upper wall of the cabin being positioned below an upper end part of a remainder of the padding machine, or of an upper end part of an apparatus for lifting the material above the padding machine or of an upper end part of an apparatus for treating the material,
   wherein the cabin is movable to a lowered access position for allowing the driver to enter the cabin directly from the ground and to exit the cabin directly to the ground,
   wherein the cabin is movable to a respective raised working position for driving the padding machine in transfer advance;
   wherein the lowered access position is vertically lower than the lowered transport position and vertically lower than the respective raised working position for driving the padding machine in transfer advance;
   and wherein the lowered access position, the lowered transport position and the respective raised working position for driving the padding machine in transfer advance are aligned with respect to each other along a vertical axis.

2. The padding machine according to claim 1, wherein the cabin includes internally a single seat for the driver and corresponding devices for controlling the padding machine, arranged at the seat.

3. The padding machine according to claim 1, wherein the cabin is supported by the main support frame and movable with respect to the plurality of vertical positions with respect to the main support frame.

4. The padding machine according to claim 1, wherein, in the respective raised working position, the upper wall of the cabin protrudes above the upper end part of the remainder of the padding machine, or of the upper end part of the apparatus for lifting the material above the padding machine or of the upper end part of the apparatus for treating the material.

5. The padding machine according to claim 1, wherein in the respective raised working position, a front face of the cabin is directed longitudinally forward.

6. The padding machine according to claim 5, wherein the cabin is movable between the respective raised working position for driving the padding machine in transfer advance and the lowered access position, or between the respective raised working position for driving the padding machine in transfer advance or the lowered access position, and the lowered transport position, with the vertical movement, or with the movement perpendicular to the ground, or with movement perpendicular to the main support frame of the padding machine.

7. The padding machine according to claim 1, wherein the cabin is movable to a respective lateral working position, to control a respective side of the padding machine, or to respective first and second opposite lateral working positions, to control respective sides of the padding machine, and wherein, in the respective lateral working position, a corresponding wall or front face of the cabin laterally faces the padding machine.

8. The padding machine according to claim 7, wherein, in the respective lateral working position, the cabin projects in a cantilevered manner sideways to the padding machine.

9. The padding machine according to claim 1, wherein the cabin is movable to a respective working position projecting in a cantilevered manner from the padding machine, supported by the main support frame.

10. The padding machine according to claim 9, wherein, in the respective raised working position for driving the padding machine in transfer advance, the cabin projects in a cantilevered manner longitudinally with respect to the padding machine.

11. The padding machine according to claim 1, wherein, in a respective raised working position, the cabin is movable, through a rotation movement with respect to a respective perpendicular or vertical axis to respective first and second opposite lateral working positions, to control respective sides of the padding machine.

12. The padding machine according to claim 11, wherein the rotation axis is outside the cabin and is rearward and spaced from the cabin.

13. The padding machine according to claim 11, wherein the cabin is movable, through the rotation movement, between the respective first and second opposite lateral working positions, to control the respective sides, with an angular movement of 180°.

14. The padding machine according to claim 11, wherein the cabin is movable, through the rotation movement, between the respective lateral working position to the respective raised working position for driving the padding machine in transfer advance with an angular movement of 90°.

15. The padding machine according to claim 1, and further comprising a transport mechanism attached to the main support frame, the transport mechanism including rotating tracks for engaging the ground for moving the padding machine with respect to the ground.

\* \* \* \* \*